(12) United States Patent
Malladi et al.

(10) Patent No.: US 7,889,755 B2
(45) Date of Patent: Feb. 15, 2011

(54) HSDPA SYSTEM WITH REDUCED INTER-USER INTERFERENCE

(75) Inventors: Durga Prasad Malladi, San Diego, CA (US); Peter Gaal, San Diego, CA (US); Yongbin Wei, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 641 days.

(21) Appl. No.: 11/376,604

(22) Filed: Mar. 14, 2006

(65) Prior Publication Data

US 2006/0268919 A1 Nov. 30, 2006

Related U.S. Application Data

(60) Provisional application No. 60/667,573, filed on Mar. 31, 2005.

(51) Int. Cl.
H04J 3/26 (2006.01)
(52) U.S. Cl. .................. 370/432; 370/338; 370/329; 370/335
(58) Field of Classification Search .......... 370/432, 370/338, 329, 335, 330, 332; 375/148, 150
See application file for complete search history.

(56) References Cited

U.S. PATENT DOCUMENTS

| 6,111,991 | A | 8/2000 | Ribas-Corbera et al. |
| 7,292,854 | B2 * | 11/2007 | Das et al. .................. 455/434 |
| 2003/0012264 | A1 * | 1/2003 | Papasakellariou et al. ... 375/148 |

(Continued)

FOREIGN PATENT DOCUMENTS

CN 1414726 4/2003

(Continued)

OTHER PUBLICATIONS

Ville Haikola et al., "HSDPA performance with parallel interference cancellation", PIMRC 2004, 15th IEEE International symposium on Personal, Indoor and Mobile Radio Communications.*

(Continued)

*Primary Examiner*—George Eng
*Assistant Examiner*—Muthuswamy G Manoharan
(74) *Attorney, Agent, or Firm*—W. Chris Kim; Stanton Braden (57) ABSTRACT

In a wireless network (100) with HSDPA-enabled user equipment devices (130), the base transceiver station (120) transmits to each HSDPA-enabled UE information regarding allocation of HSDPA codes and associated modulation techniques for other HSDPA-enabled UEs. Using this additional control information, each UE configures decision feedback filter of its equalizer to reduce inter-user interference. The additional control information may be transmitted in a packet (300) that includes a CRC portion (310) with the packet's CRC masked by a common ID, which is known to the HSDPA-enabled UEs. To reduce the number of bits needed to transmit the additional control information, the HSDPA codes used with a particular modulation technique are allocated consecutively. For each modulation technique, only the beginning code and the total number of codes need be known to the UEs. The number of codes used with each modulation technique may be allowed to change once in several TTIs.

8 Claims, 5 Drawing Sheets

U.S. PATENT DOCUMENTS

| | | | |
|---|---|---|---|
| 2003/0035403 A1* | 2/2003 | Choi et al. | 370/342 |
| 2003/0157953 A1 | 8/2003 | Das et al. | |
| 2003/0161422 A1* | 8/2003 | Bi | 375/348 |
| 2004/0032848 A1* | 2/2004 | Papasakellariou | 370/342 |

FOREIGN PATENT DOCUMENTS

| | | |
|---|---|---|
| EP | 0892564 A2 | 1/1999 |
| EP | 1315380 A2 | 5/2003 |
| EP | 1641161 A | 3/2006 |
| JP | 200284214 | 3/2002 |
| JP | 2004159343 | 6/2004 |
| JP | 200557758 | 3/2005 |
| JP | 2006506836 | 2/2006 |
| WO | WO0018067 | 3/2000 |
| WO | WO0018130 A1 | 3/2000 |
| WO | WO0108134 | 2/2001 |
| WO | WO02085038 A1 | 10/2002 |
| WO | WO2004004359 A1 | 1/2004 |
| WO | WO2004023819 | 3/2004 |
| WO | WO 2005/013527 A | 2/2005 |

OTHER PUBLICATIONS

Telecommunications Industry Association, "Mobile Station-Base Station Compatibility Standard for Dual-Mode Wideband Spread Spectrum Cellular System," TIA/EIA-95, Jul. 1993.

Telecommunications Industry Association, "Recommended Minimum Performance Standards for Dual-Mode Spread Spectrum Cellular Mobile Stations," TIA/EIA-98-C, Nov. 1999.

"3rd Generation Partnership Project; Technical Specification Group Radio Access Network; Physical channels and mapping of transport channels onto physical channels (FDD)", 3GPP TS 25.211 V6.4.0, Release 6, Mar. 2005.

"3rd Generation Partnership Project; Technical Specification Group Radio Access Network; Multiplexing and channel coding (FDD)", 3GPP TS 25.212 V6.4.0, Release 6, Mar. 2005.

"3rd Generation Partnership Project, Technical Specification Group Radio Access Network; Spreading and modulation (FDD)", 3GPP TS 25.213 V6.2.0, Release 6, Mar. 2005.

"3rd Generation Partnership Project; Technical Specification Group Radio Access Network; Physical layer procedures (FDD)", 3GPP TS 25.214 V6.5.0, Release 6, Mar. 2005.

"3rd Generation Partnership Project, Physical Layer Standard for cdma2000 Spread Spectrum Systems", 3GPP2 C.S0002-A, V6.0, Release A, Feb. 8, 2002.

"3rd Generation Partnership Project; Upper Layer (Layer 3) Signaling Standard for cdma2000 Spread Spectrum Systems—Release A Addendum 2", 3GPP2 C.S0005-A, V6.0, Feb. 2002.

Telecommunications Industry Association, "cdma2000 High Rate Packet Data Air Interface Specification," TIA/EIA-856, Nov. 2000.

International Search Report—PCT/US06/011745—International Search Authority, European Patent Office—Aug. 9, 2006.

Written Opinion—PCT/US06/011745—International Search Authority, European Patent Office—Aug. 9, 2006.

International Preliminary Report on Patentability—PCT/US06/011745—The International Bureau of WIPO, Geneva, Switzerland—Oct. 3, 2007.

Ghauri I et al.: "Linear receivers for the DS-CDMA downlink exploiting orthogonality of spreading sequences", Signals, Systems & Computers, 1998. Nov. 1, 1998, XP010324192.

Thomas J: "Multiuser interference suppression in wideband broadcast CDMA networks", Communications, Institution of Electrical Engineers, GB, Aug. 12, 2003, XP006020617.

Chung Tao Chu et al: "Bi-directional object based coding in video compression at very low bit rate" Signal Processing, 1996, 3"D International Conference on Beijing, China Oct. 14-18, 1996, pp. 986-989, ISBN: (-7803-2912-0.

Taiwanese Search Report - TW095111680 - Search Authority - TIPO - Jul. 20, 2009.

Xu Wand Hauske G: "picture quality evaluation based on error segmentation" Proceedings of the conference on visual com.nunications and image processing 94, Chicago, IL, USA, Sep. 25-28, 1994, vol. 2308, Sep. 25, 1994, pp. 1454-1465, The International Society of Optical Engineering, USA ISSN: 0277-786X.

* cited by examiner

HSDPA SYSTEM WITH REDUCED INTER-USER INTERFERENCE

CLAIM OF PRIORITY UNDER 35 U.S.C. §119

The present Application for Patent claims priority to Provisional Application Ser. No. 60/667,573, entitled Method and Apparatus for Frequency Domain Equalization, filed on Mar. 31, 2005. This provisional application is assigned to the assignee of the present Application, and is expressly incorporated by reference as if fully set forth herein, including all figures, tables, and claims.

BACKGROUND

1. Field

The present invention relates generally to telecommunications, and, more specifically, to frequency domain equalization in high speed data packet access (HSDPA) point-to-multipoint communication systems.

2. Background

A modern communication system is expected to provide reliable data transmission for a variety of applications, including voice and data applications. In a point-to-multipoint communications context, known communication systems are based on frequency division multiple access (FDMA), time division multiple access (TDMA), code division multiple access (CDMA), and perhaps other multiple access communication schemes.

A CDMA system may be designed to support one or more CDMA standards, such as (1) the "TIA/EIA-95 Mobile Station-Base Station Compatibility Standard for Dual-Mode Wideband Spread Spectrum Cellular System" (this standard with its enhanced revisions A and B will be referred to as the "IS-95 standard"), (2) the "TIA/EIA-98-C Recommended Minimum Standard for Dual-Mode Wideband Spread Spectrum Cellular Mobile Station" (the "IS-98 standard"), (3) the standard sponsored by a consortium named "3rd Generation Partnership Project" (3GPP) and embodied in a set of documents including documents known as 3G TS 25.211, 3G TS 25.212, 3G TS 25.213, and 3G TS 25.214 (the "W-CDMA standard"), (4) the standard sponsored by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," (the "cdma2000 standard" collectively), (5) the 1xEV-DO standard "TIA/EIA/IS-856 cdma2000 High Rate Packet Data Air Interface Specification", and (6) certain other standards. The standards listed above are incorporated by reference as if fully set forth herein, including annexes, appendices, and other attachments.

In 3GPP Release 5 HSDPA, a base transceiver station of an access network sends downlink payload data to user equipment devices on High Speed Downlink Shared Channel (HS-DSCH), and the control information associated with the downlink data on High Speed Shared Control Channel (HS-SCCH). There are 256 Orthogonal Variable Spreading Factor (OVSF or Walsh) codes used for data transmission. In HSDPA systems, these codes are partitioned into release 1999 (legacy system) codes that are typically used for cellular telephony (voice), and HSDPA codes that are used for data services. In the OVSF code tree structure, the partitioning is such that if a node belongs to the HSDPA, then all sub-nodes of that node also belong to HSDPA. In known systems, codes are partitioned at a level where there are 16 nodes, with one node assigned to other than HSDPA communications. Because zero code is not usable, a maximum of 15 codes can be used for HSDPA. For HSDPA transmissions, the code allocation is dynamic, and can generally change from one transmission time interval ("TTI") to the next. Thus, there can be more than 15 HSDPA devices served within a cell. The more HSDPA codes a device is allocated, the higher the downlink data rate available to that device.

For each TTI, the dedicated control information sent to an HSDPA-enabled user equipment device indicates to the device which codes within the code space will be used to send downlink payload data to the device, and the modulation that will be used for transmission of the downlink payload data. The control information is sent together with its associated cyclic redundancy check (CRC) block. The CRC block is obtained by computing a 16-bit CRC for the control information packet, and then performing an exclusive OR (XOR) operation on the computed CRC and the unique 16-bit ID of the user equipment device. The 16-bit CRC of each control channel is thus masked with the unique 16-bit ID of the user equipment device. Each user equipment device monitors a number of control channels, four, for example, but receives the dedicated control information intended for the device on only one control channel specific to the particular user equipment device. The user equipment device does not evaluate CRCs for any of the other user equipment devices in the cell, and does not have the control data for the other user equipment devices.

It is desirable to cancel out interference from the downlink data received by the user equipment devices. Interference can be classified as inter-symbol interference (ISI), which is from the same user due to multi-paths, and inter-user interference (IUI), which is interference from other users. Most of the interference received from the serving HSDPA cell/site is inter-symbol interference because the codes are orthogonal. But the orthogonality assumption holds generally only for additive white Gaussian noise (AWGN) transmission channels. If there is multi-path, code orthogonality is lost to some degree, and inter-user interference arises. In known code division multiple access systems, performance degradation due to inter-user interference is simply tolerated. It would be desirable, however, to cancel out inter-user interference to improve system performance.

Interference cancellation is carried out by equalization. Knowledge of modulation techniques used within the code space is necessary for effective equalization of received signals. Release 1999 codes are generally used with Quadrature Phase-Shift Keying (QPSK), so user equipment devices have this information. But as noted above, in HSDPA systems both modulation and code allocation are user-specific and dynamic, and a specific user equipment device does not have this information for HSDPA codes other than the device's own allocated codes. Because of higher data rates envisioned for HSDPA systems, inter-user interference becomes more significant.

Interference cancellation may also be carried out by the user equipment device by subtracting known signals received from HSDPA cells/sites other than its serving cell/site. To do this more efficiently, the user equipment device needs to have information about the HSDPA codes allocated in those other cells/sites.

There is therefore a need in the art for methods and apparatus that convey to the user equipment devices information regarding code allocation of HSDPA codes and modulation used with the HSDPA codes. There is also a need in the art to convey such information within the framework of legacy CDMA systems and with minimal consumption of bandwidth, power, and computational resources.

SUMMARY

Embodiments disclosed herein address the above stated needs by providing a mechanism to signal to a particular HSDPA user equipment device (or to all user equipment devices in a cell/site) the modulation and code space usage of all HSDPA devices, enabling the particular user equipment device to configure the decision feedback filter of its equalizer to reduce interference due to transmission to other HSDPA devices.

In an embodiment, a method is provided for transmitting data from a radio network to a plurality of user equipment devices. According to the method, a first type of control information is transmitted from the radio network to a first user equipment device of the plurality of user equipment devices. The first type of control information relates to a time transmission interval (TTI), and includes indications (description) of code allocation and modulation technique of transmission of payload data to the first user equipment device during the TTI. The method also includes sending a message with a second type of control information from the radio network to at least the first user equipment device. The second type of control information includes information regarding code allocation and modulation technique of transmission during the TTI of payload data to at least a second user equipment device of the plurality of user equipment devices. The second user equipment device is not the same as the first user equipment device.

In an embodiment, a base transceiver station in a radio network is provided for communicating with a plurality of wireless user equipment devices. The base transceiver station includes a transmitter and a processor coupled to the transmitter. The transmitter is configured to transmit payload data to the plurality of wireless user equipment devices on a first shared channel carried by a downlink carrier, and to transmit control information to the plurality of wireless user equipment devices on a second shared channel. The processor is configured to cause the transmitter to transmit to a first user equipment device of the plurality of user equipment devices a first type of control information relating to a time transmission interval (TTI). The first type of control information includes indications of code allocation and modulation technique of transmission of payload data to the first user equipment device during the TTI. The processor is also configured to cause the transmitter to send a message to at least the first user equipment device. The message includes second type of control information, including information regarding code allocation and modulation technique of transmission during the TTI of payload data to at least a second user equipment device of the plurality of user equipment devices. The second user equipment device is different from the first user equipment device.

In an embodiment, a base transceiver station for wirelessly communicating with a plurality of user equipment devices in a radio network includes a transmitter and a processor coupled to the transmitter. The transmitter is configured to transmit payload data to the plurality of wireless user equipment devices on a first shared channel carried by a downlink carrier, and to transmit control information to the plurality of wireless user equipment devices on a second shared channel. The processor is configured to cause the transmitter to transmit to each user equipment device of the plurality of user equipment devices that is scheduled to receive payload data during a time transmission interval (TTI) a first type of control information relating to the TTI. The first type of control information includes indications of code allocation and modulation technique of transmission of payload data to each user equipment device during the TTI. The transmitter sends different first type control information to each user equipment device. The processor is also configured to send a message to all user equipment devices of the plurality of user equipment devices that are scheduled to receive payload data during the TTI. The message includes a second type of control information, including information regarding code allocation and modulation technique of transmission of payload data to all user equipment devices of the plurality of user equipment devices that are scheduled to receive payload data during the TTI.

In an embodiment, a method of equalizing payload data is provided. The method includes the following steps:

(1) Receiving by a user equipment device on a first downlink shared channel of a carrier a first type of control information relating to a time transmission interval (TTI). The first type of control information includes indications of code allocation and modulation technique of transmission of payload data to the user equipment device during the TTI.

(2) Receiving by the user equipment device on the first downlink shared channel a second type of control information. The second type of control information includes information regarding code allocation and modulation technique of transmission of payload data to a plurality of user equipment devices during the TTI.

(3) Configuring an equalizer of the user equipment device in accordance with the second type of control information.

(4) Receiving by the user equipment device on a second downlink shared channel of the carrier payload data during the TTI.

(5) Using the equalizer configured in accordance with the second type of control information to equalize and reduce inter-user interference in the payload data received by the user equipment device during the TTI.

In an embodiment, a wireless user equipment device for communicating with a base transceiver station of a radio network includes a receiver, an equalizer, and a processing circuit coupled to the receiver and to the equalizer. The receiver is configured to receive on a first shared channel of a carrier of the radio network a first type of control information relating to a time transmission interval (TTI). The first type of control information includes indications of code allocation and modulation technique for transmission of payload data to the wireless user equipment device during the TTI. The receiver is also configured to receive on the first shared channel a second type of control information, which includes information regarding code allocation and modulation technique of transmission of payload data to a plurality of wireless user equipment devices during the TTI. The processing circuit is arranged to configure the equalizer in accordance with the second type of control information. The processing circuit is also arranged to configure the receiver to receive on a second shared channel the transmission of the payload data to the wireless user equipment device during the TTI. The processing circuit is further arranged to use the equalizer configured in accordance with the second type of control information to equalize and reduce interference in the received payload data.

In an embodiment, a base transceiver station is provided for communicating with a plurality of wireless user equipment devices using high speed data packet access (HSDPA) in a radio network. The base transceiver station includes means for transmitting and means for processing. The means for transmitting is configured to transmit to the plurality of wireless user equipment devices (1) payload data on a High Speed Downlink Shared Channel (HS-DSCH) carried by a downlink carrier, and (2) control information on a High Speed Shared Control Channel (HS-SCCH). The means for processing is configured to cause the means for transmitting to transmit to a first user equipment device of the plurality of user equipment devices a first type of control information relating to a time transmission interval (TTI). The first type of control information includes code allocation and modulation technique of HSDPA transmission of payload data to the first user equipment device during the TTI. The means for processing is also configured to cause the means for transmitting to send a message with a second type of control information to at least the first user equipment device. The second type of control information includes information regarding code allocation and modulation technique of HSDPA transmission of payload data to at least a second user equipment device of the plurality of user equipment devices during the TTI. The second user equipment device is not the same as the first user equipment device.

In an embodiment, a wireless user equipment device for communicating with a base transceiver station of a radio network includes means for receiving, means for equalizing, and means for processing. The means for processing is coupled to the means for receiving and to the means for equalizing. The means for receiving is configured to receive on a High Speed Shared Control Channel (HS-SCCH) of a carrier of the radio network a first type of control information relating to a time transmission interval (TTI). The first type of control information includes code allocation and modulation technique for HSDPA transmission of payload data to the wireless user equipment device during the TTI. The means for receiving is also configured to receive on the HS-SCCH a second type of control information, which includes information regarding code allocation and modulation technique of HSDPA transmission of payload data to a plurality of wireless user equipment devices during the TTI. The means for processing is arranged to configure the means for equalizing in accordance with the second type of control information. The means for processing is also arranged to configure the means for receiving to receive on a High Speed Downlink Shared Channel (HS-DSCH) of the carrier the HSDPA transmission of the payload data to the wireless user equipment device during the TTI. The means for processing is further arranged to use the means for equalizing configured in accordance with the second type of control information to equalize and reduce interference in the received payload data.

In an embodiment, a machine-readable medium has instructions embedded therein. When the instructions are executed by at least one processor of a base transceiver station used for communicating with a plurality of wireless user equipment devices in a radio network, the instructions cause the base transceiver station to perform operations including these:

(1) Transmitting payload data to the plurality of wireless user equipment devices on a first shared channel carried by a downlink carrier.

(2) Transmitting control information to the plurality of wireless user equipment devices on a second shared channel.

(3) Transmitting to a first user equipment device of the plurality of user equipment devices a first type of control information relating to a time transmission interval (TTI). The first type of control information includes indications of code allocation and modulation technique of transmission of payload data to the first user equipment device during the TTI.

(4) Sending a message with a second type of control information to at least the first user equipment device. The second type of control information includes information regarding code allocation and modulation technique of transmission of payload data to at least a second user equipment device of the plurality of user equipment devices during the TTI. The second user equipment device is not the same as the first user equipment device.

In an embodiment, a machine-readable medium has instructions embedded therein. When the instructions are executed by at least one processor of a wireless user equipment device used for communicating with a base transceiver station of a radio network, the instructions cause the wireless user equipment device to perform operations including these:

(1) Receiving on a first shared channel of a carrier of the radio network a first type of control information relating to a time transmission interval (TTI). The first type of control information includes indications of code allocation and modulation technique for transmission of payload data to the wireless user equipment device during the TTI.

(2) Receiving on the first shared channel a second type of control information. The second type of control information includes information regarding code allocation and modulation technique of transmission of payload data to a plurality of wireless user equipment devices during the TTI.

(3) Configuring an equalizer in accordance with the second type of control information.

(4) Receiving on a second shared channel of the carrier the transmission of the payload data to the wireless user equipment device during the TTI.

(5) Using the equalizer configured in accordance with the second type of control information to equalize and reduce interference in the received payload data. These and other embodiments and aspects of the present invention will be better understood with reference to the following description, drawings, and appended claims.

DETAILED DESCRIPTION

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity.

The word "exemplary" is used herein to mean "serving as an example, instance, or illustration." Any embodiment described herein as "exemplary" is not necessarily to be construed as preferred or advantageous over other embodiments. All of the embodiments described in this description are exemplary embodiments provided to enable persons skilled in the art to make or use the invention, and not to limit the scope of legal protection afforded the invention, which is defined by the claims and their equivalents.

Base transceiver stations ("BTSs") and base station controllers ("BSCs") are parts of a network called "radio network," "RN," "access network," or "AN." A base station controller may also be referred to as a radio network controller or "RNC." Radio network may be a UTRAN or UMTS Terrestrial Radio Access Network. The radio network may transport data packets between multiple user equipment devices. The radio network may be further connected to additional networks outside the radio network, such as a corporate intranet, the Internet, or a conventional public switched telephone network ("PSTN"), and may transport data packets between each user equipment device and such outside networks.

A "dedicated ID" refers to a unique identifier of a user equipment device. Control information can be transmitted to the user equipment device associated with the dedicated ID so that the CRC (or some other type of error detection information, such as a checksum) of the control information is masked (and can be unmasked) with the device's dedicated ID. As more fully described below, the control information transmitted using the dedicated ID is intended only for the device associated with the dedicated ID. A "common ID" refers to an identifier used to mask (and unmask) control information transmitted to multiple HSDPA-enabled user equipment devices within a cell or site, for example, all HSDPA-enabled devices scheduled to receive HSDPA downlink transmissions during a given TTI on the same High Speed Downlink Shared Channel. Control information can be transmitted to the user equipment devices so that the CRC (or some other type of error detection information, such as a checksum) of the control information is masked (and can be unmasked) with the common ID known to the devices. As more fully described below, common ID control information includes data intended to allow the HSDPA-enabled devices to configure their respective equalizers to enhance suppression of inter-user interference.

Figure 1:
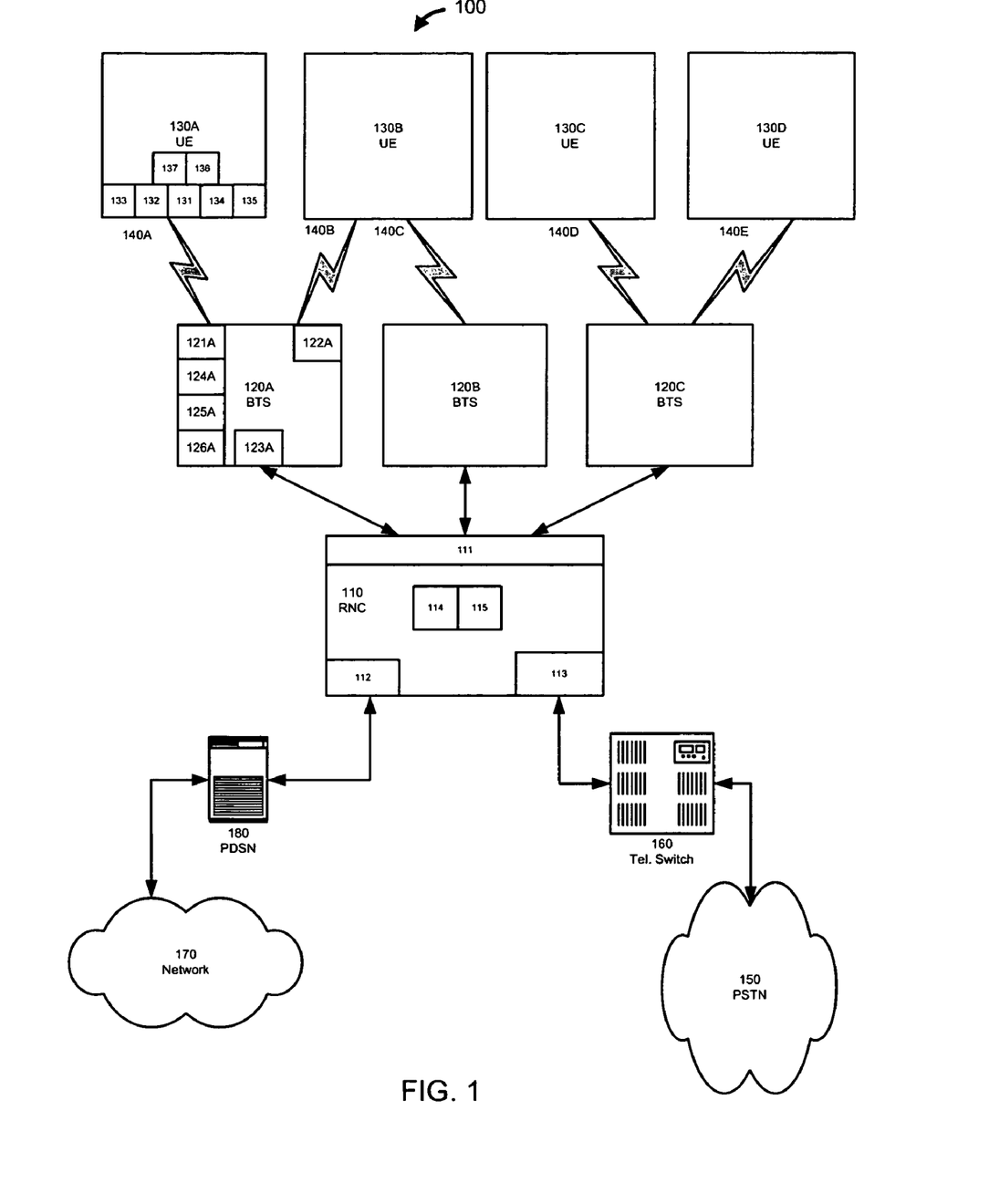
FIG. 1 illustrates selected components of a communication network configured in accordance with an embodiment of the present invention.

FIG. 1 illustrates selected components of a communication network 100, which includes a radio network controller 110 coupled to wireless base transceiver stations 120A, 120B, and 120C. The base transceiver stations 120 communicate with user equipment devices 130A, 130B, 130C, and 130D through corresponding wireless connections 140A through 140E. The radio network controller 110 is coupled to a public switched telephone network 150 through a telephone switch 160, and to a packet switched network 170 through a packet data server node ("PDSN") 180. Data interchange between various network elements, such as the radio network controller 110 and the packet data server node 180, can be implemented using any number of protocols, for example, the Internet Protocol ("IP"), an asynchronous transfer mode ("ATM") protocol, T1, E1, frame relay, and other protocols.

In the illustrated embodiment, the communication network 100 provides both data communication services and cellular telephone services to the user equipment (UE) devices 130. In alternative embodiments, the communication network 100 may provide only data services.

Multiple or even all the UEs 130 may be in the same cell or site, or each UE 130 may be in a separate cell or site.

The user equipment devices 130, also known as mobile or subscriber stations, may include wireless telephones, wireless modems, personal digital assistants, wireless local loop apparatus, PC cards, external or internal modems, and other communication devices. A typical user equipment device, for example, the user equipment device 130A, includes receiver circuitry 131, transmitter circuitry 132, encoder 133, decoder 134, equalizer 135, processor 136, and memory device 137. In some variants, the receiver circuit invokes a minimum mean square error ("MMSE") structure, and the equalizer includes a decision feedback ("DF") filter. The receiver, transmitter, encoder, decoder, and equalizer are configured by the processor executing code stored in the memory device. Each user equipment device 130 is configured to communicate data using at least one transmission protocol, such as the wireless packet transmission protocols described above. The user equipment devices 130 communicate with the base transceiver stations 120 via communication channels 140A through 140E, as shown in FIG. 1. Each communication channel 140 may include both a forward link and a reverse link to a corresponding user equipment device 130.

Each of the base transceiver stations 120 includes one or more wireless receivers (e.g., the receiver 121A of the BTS 120A), one or more wireless transmitters (e.g., the transmitter 122A of the BTS 120A), radio network controller interface (e.g., the interface 123A), a memory (e.g., the memory 124A), a processor (e.g., the processor 125A), and encoder/decoder circuitry (e.g., the encoder/decoder circuitry 126A). A receiver/transmitter pair of each base transceiver station is configured by the station's processor operating under control of program code stored in the BTS's memory, to establish forward and reverse links with the user equipment devices 130 in order to send data packets to and receive data packets from the user equipment devices 130. In the case of data services, for example, the base transceiver stations 120 receive forward link data packets from the packet switched network 170 through the packet data server node 180 and through the radio network controller 110, and transmit these packets to the user equipment devices 130. The base transceiver stations 120 receive reverse link data packets that originate at the user equipment devices 130, and forward these packets to the packet switched network 170 through the radio network controller 110 and the packet data server node 180. In the case of telephone services, the base transceiver stations 120 receive forward link data packets from the telephone network 150 through the telephone switch 160 and through the radio network controller 110, and transmit these packets to the user equipment devices 130. Voice carrying packets originating at the user equipment devices 130 are received at the base transceiver stations 120 and forwarded to the telephone network 150 via the radio network controller 110 and the telephone switch 160.

In some alternative embodiments, the transmitter and the receiver of each BTS have separate processors.

The radio network controller 110 includes one or more interfaces 111 to the base transceiver stations 120, an interface 112 to the packet data server node 180, and an interface 113 to the telephone switch 160. The interfaces 111, 112, and 113 operate under control of one or more processors 114 executing program code stored in a memory device 115.

As illustrated in FIG. 1, the network 100 includes one public switched telephone network, one packet switched network, one base station controller, three base transceiver stations, and four user equipment devices. A person skilled in the art would recognize, after perusal of this document, that alternative embodiments in accordance with aspects of the invention need not be limited to any particular number of these components. For example, a lesser or a greater number of base transceiver stations and user equipment devices may be included in some embodiments. Furthermore, the communication network 100 can connect the user equipment devices 130 to one or more additional communication networks, for example, a second wireless communication network having a number of wireless user equipment devices.

Depending on conventions and on the specific implementation variants, the base transceiver stations 120 may take other forms and be referred to by other names, such as Node-B or base station system ("BSS"). Similarly, the radio network controller 110 may take other forms and be referred to by other names, such as base station controller, mobile switching center, or serving GPRS support node. The scope of the invention extends to these and similar wireless communication system components.

Focusing now on HSDPA operation, downlink transmissions to the user equipment devices 130 may be scheduled for different transmission time intervals using the 15 available HSDPA OVSF codes. For a given TTI, each user equipment device 130 may be using one or more of the 15 HSDPA codes, depending on the downlink bandwidth allocated to the device during the TTI. As has already been mentioned, for each TTI the control information indicates to the user equipment device which codes within the code space will be used to send downlink payload data (data other than control data of the radio network) to the device, and the modulation that will be used for transmission of the downlink payload data. Additionally, each user equipment device that is scheduled to receive downlink data is also sent control information regarding code allocation(s) and assigned modulation technique(s) for the other user equipment devices in the cell or site (e.g., Node-B as defined in the W-CDMA specification).

In more detail, the radio network sends control information regarding the code allocation and associated modulation technique for a particular user equipment device (e.g., the UE 130A) to the device together with the associated cyclic redundancy check ("CRC") block. The CRC block is obtained by computing a 16-bit CRC for the control information packet, and then performing an exclusive OR (XOR) operation on the computed CRC and the unique 16-bit ID of the user equipment device for which the control information is intended. The 16-bit CRC of each control information packet intended for the UE 130A is thus masked with the unique 16-bit ID of the UE 130A. The UE 130A unmasks the CRC, verifies integrity of the control information regarding its code allocation and associated modulation technique, and configures itself for reception of the downlink payload HSDPA data intended for it in accordance with this control information.

The radio network also sends additional control information to the HSDPA-enabled UEs (e.g., the UE 130A). The additional control information includes information regarding code allocation(s) and associated modulation technique(s) for other HSDPA-enabled UEs, so that each HSDPA-enabled UE can configure its equalizer in accordance with this additional control information.

Figure 2:
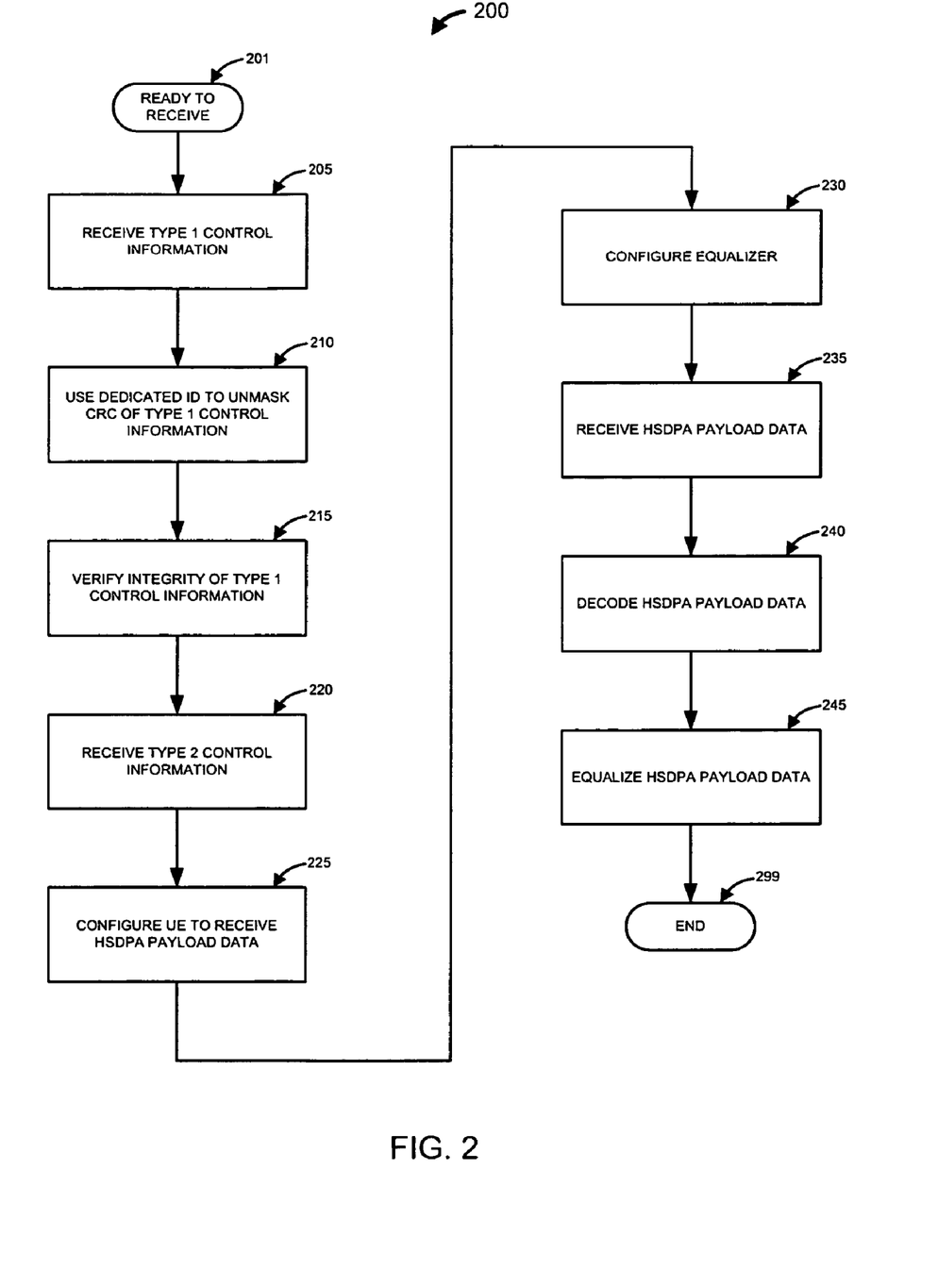
FIG. 2 illustrates selected steps of a process for receiving at a user equipment device downlink payload data and reducing inter-user interference in the received data, in accordance with an embodiment of the present invention.

FIG. 2 illustrates selected steps of a process 200 for receiving at the user equipment device 130A downlink payload data, and reducing inter-user interference in the received data. At flow point 201, the UE 130A has acquired the radio network and is ready to receive communications from a base transceiver station, e.g., the BTS 120A. At step 205, the UE 130A receives from the radio network control information regarding OVSF code(s) allocated to the UE 130A for HSDPA downlink transmission for a particular TTI, e.g., the immediately following TTI, or another TTI in a known time relationship with the TTI in which this control information is received. (For convenience, the information regarding a UE's own code allocation and associated modulation technique may be referred to as "type one control information" or "first type of control information.") This control information may be received on the High Speed Shared Control Channel.

At step 210, the UE 130A uses its own dedicated ID to unmask the CRC of the received type one control information.

At step 215, the UE 130A verifies integrity of the received type one control information.

At step 220, the UE 130A receives control information regarding code allocation(s) and associated modulation technique(s) for HSDPA transmissions to other UEs during the same TTI. (For convenience, the control information regarding code allocation(s) and associated modulation technique (s) for HSDPA transmissions to other UEs may be referred to as "type 2 control information" or "second type of control information.") This information may also be received on the High Speed Shared Control Channel.

At step 225, the UE 130A configures itself for receiving the payload data during the same TTI. For example, the UE 130 configures itself to decode the received signal using the HSDPA code or codes allocated to it for the TTI, and to demodulate the decoded data in accordance with the requirements of the modulation technique in effect for the codes allocated to the UE 130A during the TTI.

At step 230, the UE 130A configures its equalizer to reduce interference, including inter-user interference received from its serving base transceiver station or one or more non-serving BTSs, or from both, using the control information regarding code allocation and associated modulation technique(s) for HSDPA transmissions to other UEs during the same TTI. It should be noted that the UE 130A can, and typically does, also use known information regarding non-HSDPA transmissions. In some systems, all non-HSDPA transmissions (e.g., transmissions using the release 1999 codes) are made using QPSK modulation. Thus, the UE 130A has knowledge of the modulation technique used for the non-HSDPA transmissions and uses this information, in addition to the type two control information, to configure its equalizer. The equalizer may include a decision feedback filter, particularly if the receiver used for receiving the payload data invokes a minimum mean square error criterion. The equalizer may also employ other interference cancellation techniques, such as subtracting estimated overhead and/or user data signals received from other than its serving base transceiver station.

At step 235, the UE 130A receives, during the TTI, the HSDPA downlink payload data transmission on the codes allocated to it. The payload data may be received on the High Speed Downlink Shared Channel.

At step 240, the UE 130A decodes the received HSDPA transmission to obtain decoded data.

At step 245, the UE 130A equalizes the decoded data using equalizer settings configured in the step 230. Equalizing the data involves reducing interference received from various sources, for example, including (but not limited to) the interference received from the base transceiver station serving the UE 130A. The process 200 then terminates at the flow point 299. It should be noted, however, that typically the process 200 would be repeated for following TTIs, as long as there are HSDPA transmissions scheduled for the UE 130A.

In one variant, the control information for other user equipment devices (e.g., UEs 130B, 130C, and 130D) is made readable to the UE 130A as the control information is sent to the other UEs, so that the UE 130A can use this information to configure its equalizer. For example, the radio network may send the UE 130A the IDs of the other UEs, so that the UE 130A can unmask the control information intended for the other UEs. This approach, however, makes available to the UE 130A information that is of little consequence to configuring its equalizer and reducing inter-user interference. Such unneeded information may include, for example, block and packet sizes. Furthermore, reading all of the control information for all other HSDPA-enabled UEs may be resource-intensive, and may also be undesirable for privacy reasons.

Figure 3:
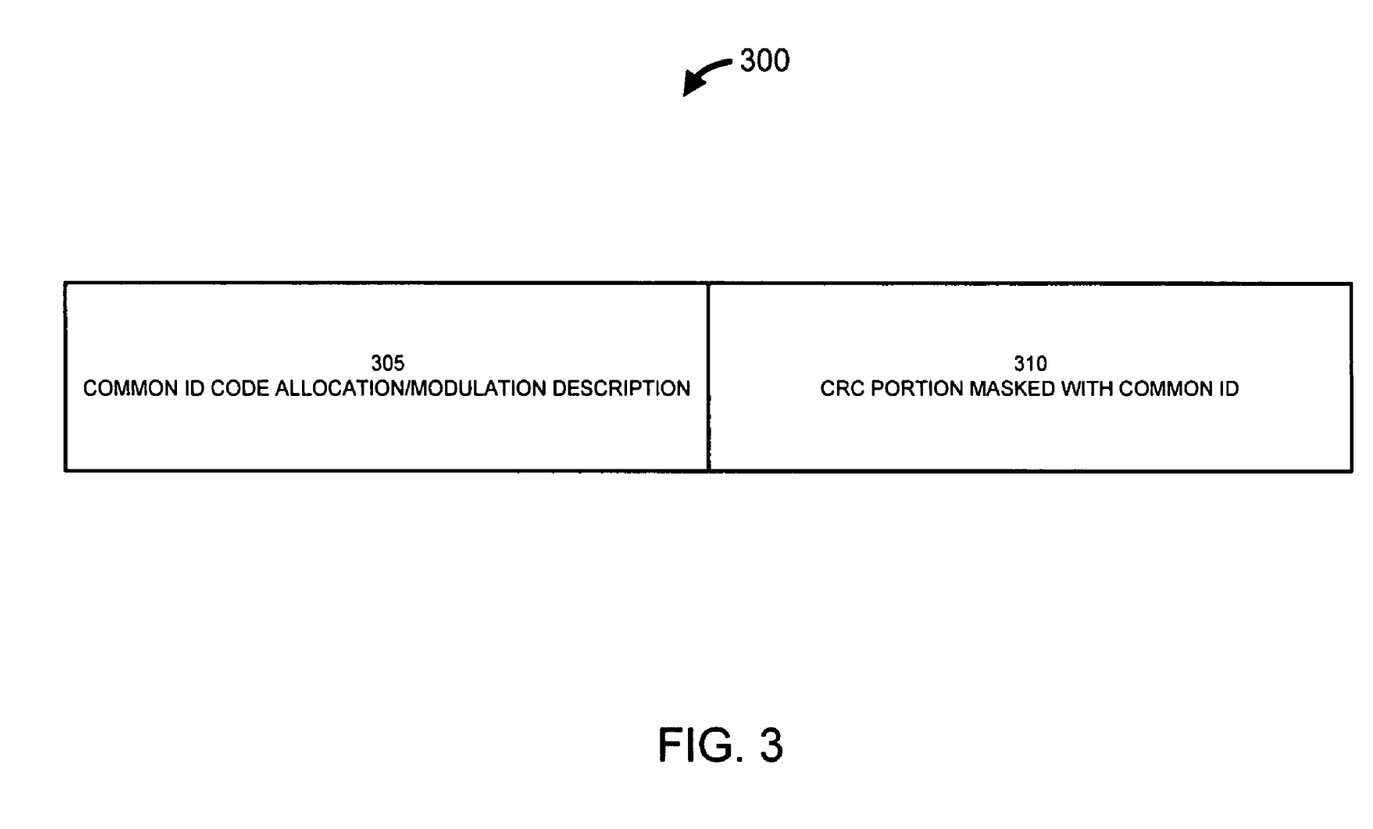
FIG. 3 illustrates a packet that includes a data portion with control data describing code allocation and modulation techniques for multiple HSDPA-enabled user equipment devices, and a common ID masked CRC portion, in accordance with an embodiment of the present invention.

In another variant, each HSDPA-enabled UE (e.g., the UE 130A) is allocated a common ID in addition to a dedicated ID. The common ID is the same for all the UEs in the cell or site (Node-B). Furthermore, the common ID may be the same for all the UEs in a group of cells, or even in the entire radio network, thereby reducing the signaling overhead associated with the need for communicating a new common ID to UEs that are changing serving cells. The radio network (e.g., the base transceiver station 120A) indicates the HSDPA OVSF code allocation and associated modulation techniques on the High Speed Shared Control Channel. The code allocation and modulation information may be transmitted in a way similar to the way control information is transmitted using dedicated UE IDs. This is illustrated in FIG. 3, which depicts a packet 300 that includes a data portion 305 and a CRC portion 310.

The data portion 305 includes control data describing code allocation and modulation techniques for all the HSDPA codes. The CRC portion is derived by computing the CRC of the packet and then masking (e.g., XOR-ing) it with the common ID. The UEs can then compute the CRC of the received packet, unmask the CRC using the common ID, and verify the integrity of the control data in the received packet. Each UE scheduled to receive HSDPA transmission during the TTI associated with the control data in the received packet can then configure its equalizer in accordance with the control data, including the information regarding code allocation and modulation of other HSDPA UEs.

As in the case of dedicated control data (type one control data for the individual UEs transmitted using the dedicated IDs), the control data using the common ID may be sent on the High Speed Shared Control Channel for every TTI in which HSDPA downlink transmissions are scheduled. For each such TTI, the UEs decode both the dedicated and the common control information using, respectively, the dedicated and the common IDs.

In a more specific variant, HSDPA code allocation is done so that all codes with the same modulation technique are consecutive. By consecutive we mean that the codes are arranged sequentially with respect to some order, without gaps. The order used here may be the order on the code tree, for example, from left to right or from right to left. In general, the particular order is not important, as long as the order is known to both the radio network and the UEs. For example, we can number the 15 HSDPA OVSF codes from 1 to 15 in an arbitrary manner, designating each of these codes $C_n$, where n is a number defining the place of the code $C_n$ within the sequence. If M (M≦15) codes are needed for UEs scheduled to receive QPSK-modulated transmissions during a particular TTI, then these UEs can be allocated consecutive codes $C_n$ for n=1 through n=M; UEs scheduled to receive 16-QAM-modulated transmissions could then be assigned codes $C_n$ for n>M. (Of course, the code assignment can be reversed, with the 16-QAM UEs being allocated the lower-numbered codes.) In this way, fewer bits need to be transmitted to inform each HSDPA-enabled UE regarding HSDPA code allocation and modulation of other UEs, reducing power consumption, bandwidth, and the additional need for other resources.

Because only two modulation techniques are used in this variant, the information regarding code allocation may be transmitted as four numbers: (1) starting point in the code tree for QPSK codes, (2) the number of the QPSK codes, (3) starting point in the code tree for 16-QAM codes, and (4) the number of 16-QAM codes. Each of these numbers can be expressed in four bits, since there are a total of 15 HSDPA codes. Thus, a total of 16 bits would be needed in this case.

It should be noted that under certain constraints the information may be conveyed using 8 bits. For example, the UEs may assume that the first code or codes allocated are for QPSK modulation. Then, 4 bits can be used to indicate the number of QPSK codes, which is between zero and fifteen. The next sequential code in the order may then be allocated for 16-QAM-modulated transmissions. The number of 16-QAM codes, which is also between zero and fifteen, can be indicated by 4 more bits.

These schemes can be logically extended to cases where three or more modulation techniques can be used concurrently.

Figure 4:
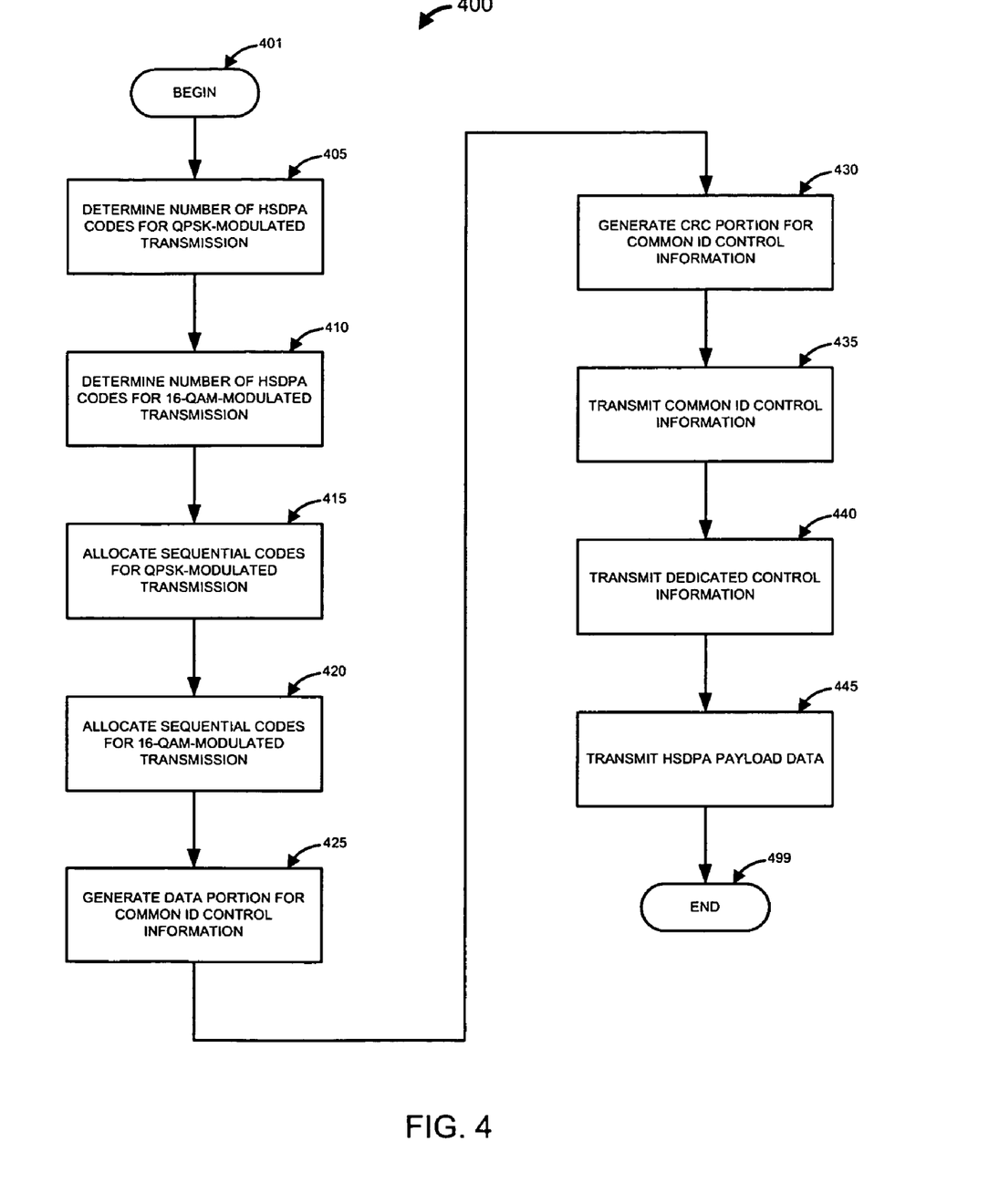
FIG. 4 illustrates selected steps of a process for transmitting to user equipment devices HSDPA payload data and control information masked with a common ID.

FIG. 4 illustrates selected steps of a process 400 for transmitting to the UEs 130 HSDPA payload data and control information using a common ID, as discussed above. The method 400 begins with flow point 401 and ends with flow point 499. This method may be performed at the base transceiver station, such as the BTS 120A.

At step 405, the BTS 120A determines a number (M) of codes for QPSK-modulated data from among the 15 available HSDPA codes, for transmission during a given TTI. The number of these codes may depend, for example, on the downlink load demands of the UEs within the area served by the BTS 120A, signal qualities associated with the UEs, quality of service requirements for the particular UE, as well as on other factors.

At step 410, the BTS 120A determines a number (N) of codes for 16-QAM-modulated data for transmission during the same TTI. The number of these codes may depend on the same factors as those relevant to the allocation of codes in the step 405. It should be understood that the sum of the numbers of codes allocated in the steps 405 and 410 (M+N) should not exceed the total number of codes available for HSDPA services. Further, as a practical matter, the steps 405 and 410 may be performed simultaneously.

At step 415, the BTS 120A sequentially allocates M codes to the UEs scheduled to receive QPSK-modulated HSDPA data during the TTI. This allocation is done consecutively from 1 to M on the code tree. If no QPSK-modulated data is scheduled during the TTI (M=0), no codes need be allocated for QPSK.

At step 420, the BTS 120A allocates N codes to the UEs scheduled to receive 16-QAM-modulated HSDPA data during the TTI. This allocation is done consecutively from the first code available after allocation of codes for QPSK in the step 415, i.e., beginning with the (M+1) code. If no 16-QAM data is scheduled for transmission during the TTI (N=0), no codes need be allocated for 16-QAM.

At step 425, the BTS 120A generates the data portion 305 (shown in FIG. 3) of the packet 300 to be transmitted using the common ID. Here, the data portion is 16 bits in length and may include the first code for QPSK-modulated data, the number of codes for the QPSK-modulated data, the first code for the 16-QAM-modulated data, and the number of codes for the 16-QAM-modulated data.

At step 430, the BTS 120A generates the CRC portion 310 of the packet 300. For example, the BTS 120A computes the CRC of the data portion 305, and masks it using the common ID (which was transmitted to the UEs at some earlier time by the BTS 120A or another network component).

At step 435, the BTS 120A transmits the packet to the UEs 130 on the HS-SCCH, including both the data portion and the CRC portion.

At step 440, the BTS 120A transmits dedicated control information to each of the UEs 130 scheduled to receive HSDPA data during the TTI. The dedicated control information for each UE 130 may include the code(s) allocated to the UE 130 and the modulation associated with the code(s). As has already been discussed, the dedicated control information is transmitted on the HS-SCCH using the ID dedicated to the particular UE 130.

At step 445, the BTS 120A transmits to the UEs 130 the HSDPA payload data, using the code allocations as determined in the previous steps. This transmission takes place during the TTI.

Even a relatively small number of bits used for the common ID control information consumes resources. To reduce the need for these additional resources, in one variant the partitioning of the HSDPA codes into QPSK and 16-QAM codes is not allowed to vary from one TTI to the next. Instead, it is allowed to vary only after a predetermined number of TTIs. If for example, the split is such that six QPSK and nine 16-QAM codes are allocated for one TTI, then the radio network may force this split to continue for the next TTI, and possibly one or more following TTIs, even when the split would otherwise have been changed in response to the varying conditions, such as varying signal strengths and load requirements. In one particular variant, the split is allowed to change every 10 milliseconds, i.e., once every five TTIs.

Figure 5:
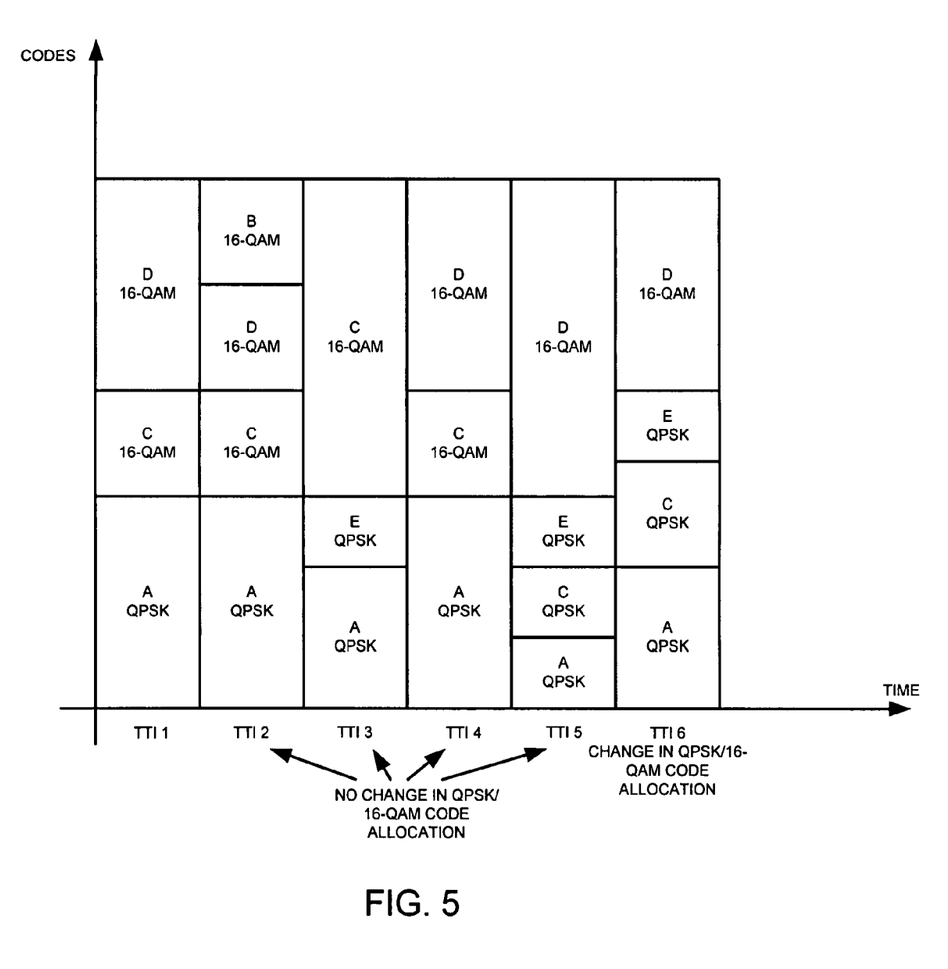
FIG. 5 illustrates an example of constraining variations in QPSK/16-QAM code partitioning, in accordance with an embodiment of the present invention.

This is illustrated in FIG. 5, where the horizontal axis of the graph represents time, while the vertical axis represents code allocation for the HSDPA-enabled UEs A through E. In the first TTI, six QPSK codes and nine 16-QAM codes are allocated; all the QPSK codes (1-6) are allocated for UE A, while the allocation of 16-QAM codes is split between UEs C and D. In the next TTI (i.e., the second TTI), the six QPSK to nine 16-QAM partitioning of codes is maintained, with all the QPSK codes still being allocated to the UE A. The 16-QAM codes, however, are now divided between UEs B, C, and D. During the third through fifth TTIs, the QPSK/16-QAM partitioning continues to be maintained, but with different numbers of codes being allocated to the different UEs. Only on the sixth TTI, is the partitioning of the HSDPA codes allowed to vary in response to the varying network conditions. This example is, of course, given for illustration only; the specific code partitionings, allocations, and changes in them can vary.

Although steps of the various methods have been described serially in this disclosure, some of these steps may be performed by separate elements in conjunction or in parallel, asynchronously or synchronously, in a pipelined manner, or otherwise. There is no particular requirement that the steps be performed in the same order in which this description lists them, except where explicitly so indicated, otherwise made clear from the context, or inherently required. Furthermore, not every illustrated step is required in every embodiment in accordance with the invention, while some steps that have not been specifically illustrated may be desirable in some embodiments in accordance with the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To show clearly this interchangeability of hardware and software, various illustrative components, blocks, modules, circuits, and steps have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user equipment device. Alternatively, the processor and the storage medium may reside as discrete components in a user equipment device.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A method of transmitting data from a radio network to a plurality of user equipment devices, the method comprising:

transmitting from the radio network to a first user equipment device of the plurality of user equipment devices a first type of control information relating to a time transmission interval (TTI), the first type of control information comprising indications of code allocation and modulation technique of transmission of payload data to the first user equipment device during the TTI;

sending a message from the radio network to each of the plurality of user equipment devices, the message comprising a second type of control information, the second type of control information comprising information regarding code allocation and modulation technique of transmission of payload data to at least a second user equipment device of the plurality of user equipment devices during the TTI, the second user equipment device being different from the first user equipment device, wherein:

a) the plurality of user equipment devices comprises at least three user equipment devices and are configured for High Speed Data Packet Access (HSDPA) operation;

b) the indications of code allocation and modulation technique of transmission of payload data to the first user equipment device during the TTI comprise indications of code allocation and modulation technique of HSDPA transmission of payload data to the first user equipment device during the TTI;

c) the information regarding code allocation and modulation technique of transmission of payload data to at least the second user equipment device during the TTI comprises information regarding code allocation and modulation technique of HSDPA transmission of payload data to at least the second user equipment device during the TTI;

d) the second type of control information comprises information regarding code allocation and modulation technique of HSDPA transmission of payload data to each of the plurality of user equipment devices during the TTI;

transmitting payload data from a first base transceiver station of the radio network to said each of the plurality of user equipment devices during the TTI on a High Speed Downlink Shared Channel (HS-DSCH);

allocating HSDPA codes for transmission during the TTI on the HS-DSCH so that HSDPA codes associated with QPSK modulation are allocated consecutively with respect to a predetermined order of codes, and so that HSDPA codes associated with 16-QAM modulation are allocated consecutively with respect to the predetermined order, wherein the predetermined order is known to said each user equipment device;

generating the second data portion, wherein the second data portion comprises a QPSK indication of the number of HSDPA codes allocated for transmission with QPSK modulation during the TTI on the HS-DSCH, and a 16-QAM indication of the number of HSDPA codes allocated for transmission with 16-QAM modulation during the TTI on the HS-DSCH; and allowing the number of HSDPA codes allocated for transmission with QPSK modulation and the number of HSDPA codes allocated for transmission with 16-QAM modulation to change only once within a predetermined number of consecutive TTIs, the predetermined number being greater than one.

2. A method further of transmitting data from a radio network to a plurality of user equipment devices, the method comprising:

transmitting from the radio network to a first user equipment device of the plurality of user equipment devices a first type of control information relating to a time transmission interval (TTI), the first type of control information comprising indications of code allocation and modulation technique of transmission of payload data to the first user equipment device during the TTI;

sending a message from the radio network to each of the plurality of user equipment devices, the message comprising a second type of control information, the second type of control information comprising information regarding code allocation and modulation technique of transmission of payload data to at least a second user equipment device of the plurality of user equipment devices during the TTI, the second user equipment device being different from the first user equipment device, wherein:

a) the plurality of user equipment devices comprises at least three user equipment devices and are configured for High Speed Data Packet Access (HSDPA) operation;

b) the indications of code allocation and modulation technique of transmission of payload data to the first user equipment device during the TTI comprise indications of code allocation and modulation technique of HSDPA transmission of payload data to the first user equipment device during the TTI;

c) the information regarding code allocation and modulation technique of transmission of payload data to at least the second user equipment device during the TTI comprises information regarding code allocation and modulation technique of HSDPA transmission of payload data to at least the second user equipment device during the TTI;

d) the second type of control information comprises information regarding code allocation and modulation technique of HSDPA transmission of payload data to each of the plurality of user equipment devices during the TTI;

transmitting payload data from a first base transceiver station of the radio network to said each of the plurality of user equipment devices during the TTI on a High Speed Downlink Shared Channel (HS-DSCH);

allocating HSDPA codes for transmission during the TTI on the HS-DSCH so that HSDPA codes associated with QPSK modulation are allocated consecutively with respect to a predetermined order of codes, and so that HSDPA codes associated with 16-QAM modulation are allocated consecutively with respect to the predetermined order, wherein the predetermined order is known to said each user equipment device;

generating the second data portion, wherein the second data portion comprises a QPSK indication of the number of HSDPA codes allocated for transmission with QPSK modulation during the TTI on the HS-DSCH, and a 16-QAM indication of the number of HSDPA codes allocated for transmission with 16-QAM modulation during the TTI on the HS-DSCH; and allowing the number of HSDPA codes allocated for transmission with QPSK modulation and the number of HSDPA codes allocated for transmission with 16-QAM modulation to change only in every fifth TTI.

3. A base transceiver station in a radio network, for wirelessly communicating with a plurality of user equipment devices, the base transceiver station comprising:

a transmitter configured to transmit payload data to the plurality of wireless user equipment devices on a first shared channel carried by a downlink carrier, and to transmit control information to the plurality of wireless user equipment devices on a second shared channel; and a processor coupled to the transmitter, wherein the processor is configured to cause the transmitter to:

transmit to each user equipment device of the plurality of user equipment devices that is scheduled to receive payload data during a time transmission interval (TTI) a first type of control information relating to the TTI, the first type of control information comprising indications of code allocation and modulation technique of transmission of payload data to said each user equipment device during the TTI, wherein the transmitter sends different first type control information to said each user equipment device, and send a message to all user equipment devices of the plurality of user equipment devices that are scheduled to receive payload data during the TTI, the message comprising a second type of control information, the second type of control information comprising information regarding code allocation and modulation technique of transmission of payload data to said all user equipment devices of the plurality of user equipment devices that are scheduled to receive payload data during the TTI;

wherein:
the base transceiver station communicates with the plurality of user equipment devices using High Speed Data Packet Access (HSDPA);
the first shared channel is a High Speed Downlink Shared Channel (HS-DSCH);
the second shared channel is a High Speed Shared Control Channel (HS-SCCH);
the indications of code allocation and modulation technique of transmission of payload data to said each user equipment device comprise indications of code allocation and modulation technique of HSDPA transmission of payload data to said each user equipment device during the TTI; and
the information regarding code allocation and modulation technique of transmission of payload data to said all user equipment devices comprises information regarding code allocation and modulation technique of HSDPA transmission of payload data to said all user equipment devices;

wherein the processor is further configured to:
allocate HSDPA codes for transmissions during the TTI on the HS-DSCH so that HSDPA codes associated with QPSK modulation are allocated consecutively with respect to a predetermined order of codes, and so that HSDPA codes associated with 16-QAM modulation are allocated consecutively with respect to the predetermined order, wherein the predetermined order is known to said each user equipment device;
generate a data portion, wherein the data portion comprises a QPSK indication of the number of HSDPA codes allocated for transmission with QPSK modulation during the TTI on the HS-DSCH, and a 16-QAM indication of the number of HSDPA codes allocated for transmission with 16-QAM modulation during the TTI on the HS-DSCH; and
prevent the number of HSDPA codes allocated for transmission with QPSK modulation and the number of HSDPA codes allocated for transmission with 16-QAM modulation from changing more than once in every set of a predetermined number of consecutive TTIs, the predetermined number being greater than one.

4. A base transceiver station in a radio network, for wirelessly communicating with a plurality of user equipment devices, the base transceiver station comprising:
a transmitter configured to transmit payload data to the plurality of wireless user equipment devices on a first shared channel carried by a downlink carrier, and to transmit control information to the plurality of wireless user equipment devices on a second shared channel; and
a processor coupled to the transmitter, wherein the processor is configured to cause the transmitter to:
transmit to each user equipment device of the plurality of user equipment devices that is scheduled to receive payload data during a time transmission interval (TTI) a first type of control information relating to the TTI, the first type of control information comprising indications of code allocation and modulation technique of transmission of payload data to said each user equipment device during the TTI, wherein the transmitter sends different first type control information to said each user equipment device, and
send a message to all user equipment devices of the plurality of user equipment devices that are scheduled to receive payload data during the TTI, the message comprising a second type of control information, the second type of control information comprising information regarding code allocation and modulation technique of transmission of payload data to said all user equipment devices of the plurality of user equipment devices that are scheduled to receive payload data during the TTI;

wherein:
the base transceiver station communicates with the user equipment devices using High Speed Data Packet Access (HSDPA);
the first shared channel is a High Speed Downlink Shared Channel (HS-DSCH);
the second shared channel is a High Speed Shared Control Channel (HS-SCCH);
the indications of code allocation and modulation technique of transmission of payload data to said each user equipment device comprise indications of code allocation and modulation technique of HSDPA transmission of payload data to said each user equipment device during the TTI;
the information regarding code allocation and modulation technique of transmission of payload data to said all user equipment devices comprises information regarding code allocation and modulation technique of HSDPA transmission of payload data to said all user equipment devices;
the message comprises (1) a second data portion, and (2) a second error detection portion masked with a common user ID, the common user ID being known to said each user equipment device of the plurality of user equipment devices; and wherein the processor is further configured to:
computing a cyclic redundancy check (CRC) of the second data portion;
executing an exclusive OR operation on the CRC of the second data portion and the common user ID to obtain the second error detection portion masked with the common user ID; and
prevent the number of HSDPA codes allocated for transmission with QPSK modulation and the number of HSDPA codes allocated for transmission with 16-QAM modulation from changing more than once in every set of five consecutive TTIs.

5. A method of equalizing payload data, the method comprising:
receiving by a user equipment device on a first downlink shared channel of a carrier a first type of control information relating to a time transmission interval (TTI), the first type of control information comprising indications of code allocation and modulation technique of transmission of payload data to the user equipment device during the TTI;

receiving by the user equipment device on the first downlink shared channel a second type of control information, the second type of control information comprising information regarding code allocation and modulation technique of transmission of payload data to a plurality of user equipment devices during the TTI;

configuring an equalizer of the user equipment device in accordance with the second type of control information;

receiving by the user equipment device on a second downlink shared channel of the carrier payload data during the TTI;

using the equalizer configured in accordance with the second type of control information to equalize and reduce inter-user interference in the payload data received by the user equipment device during the TTI;

wherein:

the first downlink shared channel is a High Speed Shared Control Channel (HS-SCCH);

the indications of code allocation and modulation technique of transmission of payload data to the user equipment device comprise indications of code allocation and modulation technique of HSDPA transmission of payload data to the user equipment device during the TTI;

the information regarding code allocation and modulation technique of transmission of payload data to the plurality of user equipment devices comprises information regarding code allocation and modulation technique of HSDPA transmission of payload data to a plurality of user equipment devices;

the second downlink shared channel is a High Speed Downlink Shared Channel (HS-DSCH);

the step of receiving by the user equipment device on the second downlink shared channel comprises receiving by the user equipment device on the HS-DSCH of the carrier HSDPA payload data during the TTI;

wherein:

the first type of control information comprises (1) a first data portion, and (2) a first error detection portion masked with a dedicated user identifier (ID) of the user equipment device, the first error detection portion being derived from the first data portion;

the second type of control information comprises (1) a second data portion, and (2) a second error detection portion masked with a common user ID, the common user ID being known to each user equipment device of the plurality of user equipment devices;

further comprising:

unmasking the first error detection portion with the dedicated user ID, to obtain an unmasked first error detection portion;

using the unmasked first error detection portion to verify integrity of the first data portion;

unmasking the second error detection portion with the common user ID to obtain an unmasked second error detection portion; and using the unmasked second error detection portion to verify integrity of the second data portion;

wherein:

the second data portion comprises a first number indicating quantity of HSDPA codes used for QPSK modulated data during the TTI;

the second data portion comprises a second number indicating quantity of HSDPA codes used for 16-QAM modulated data during the TTI;

the step of configuring comprises programming a decision feedback filter of the equalizer to reduce interference when the first number of HSDPA codes are used for QPSK modulated data, the second number of HSDPA codes are used for 16-QAM modulated data, the HSDPA codes used for QPSK modulated data are arranged consecutively within a predetermined order, and the HSDPA codes used for 16-QAM modulated data are arranged consecutively within the predetermined order; and the step of configuring is performed only once in each TTI sequence of a third predetermined number of consecutive TTIs, the third predetermined number being greater than one.

6. A method of equalizing payload data, the method comprising:

receiving by a user equipment device on a first downlink shared channel of a carrier a first type of control information relating to a time transmission interval (TTI), the first type of control information comprising indications of code allocation and modulation technique of transmission of payload data to the user equipment device during the TTI;

receiving by the user equipment device on the first downlink shared channel a second type of control information, the second type of control information comprising information regarding code allocation and modulation technique of transmission of payload data to a plurality of user equipment devices during the TTI;

configuring an equalizer of the user equipment device in accordance with the second type of control information;

receiving by the user equipment device on a second downlink shared channel of the carrier payload data during the TTI;

using the equalizer configured in accordance with the second type of control information to equalize and reduce inter-user interference in the payload data received by the user equipment device during the TTI;

wherein:

the first downlink shared channel is a High Speed Shared Control Channel (HS-SCCH);

the indications of code allocation and modulation technique of transmission of payload data to the user equipment device comprise indications of code allocation and modulation technique of HSDPA transmission of payload data to the user equipment device during the TTI;

the information regarding code allocation and modulation technique of transmission of payload data to the plurality of user equipment devices comprises information regarding code allocation and modulation technique of HSDPA transmission of payload data to a plurality of user equipment devices;

the second downlink shared channel is a High Speed Downlink Shared Channel (HS-DSCH);

the step of receiving by the user equipment device on the second downlink shared channel comprises receiving by the user equipment device on the HS-DSCH of the carrier HSDPA payload data during the TTI;

wherein:

the first type of control information comprises (1) a first data portion, and (2) a first error detection portion masked with a dedicated user identifier (ID) of the user equipment device, the first error detection portion being derived from the first data portion;

the second type of control information comprises (1) a second data portion, and (2) a second error detection portion masked with a common user ID, the common user ID being known to each user equipment device of the plurality of user equipment devices;

further comprising:

unmasking the first error detection portion with the dedicated user ID, to obtain an unmasked first error detection portion;

using the unmasked first error detection portion to verify integrity of the first data portion;

unmasking the second error detection portion with the common user ID to obtain an unmasked second error detection portion; and using the unmasked second error detection portion to verify integrity of the second data portion;

wherein:

the second data portion comprises a first number indicating quantity of HSDPA codes used for QPSK modulated data during the TTI;

the second data portion comprises a second number indicating quantity of HSDPA codes used for 16-QAM modulated data during the TTI;

the step of configuring comprises programming a decision feedback filter of the equalizer to reduce interference when the first number of HSDPA codes are used for QPSK modulated data, the second number of HSDPA codes are used for 16-QAM modulated data, the HSDPA codes used for QPSK modulated data are arranged consecutively within a predetermined order, and the HSDPA codes used for 16-QAM modulated data are arranged consecutively within the predetermined order; and the step of configuring is performed only once in each TTI sequence of five consecutive TTIs.

7. A wireless user equipment device for communicating with a base transceiver station of a radio network, the wireless user equipment device comprising:

means for receiving;

means for equalizing; and means for processing coupled to the means for receiving and to the means for equalizing;

wherein:

the means for receiving is configured to (1) receive on a High Speed Shared Control Channel (HS-SCCH) of a carrier of the radio network a first type of control information relating to a time transmission interval (TTI), the first type of control information comprising code allocation and modulation technique for HSDPA transmission of payload data to the wireless user equipment device during the TTI, and (2) receive on the HS-SCCH a second type of control information, the second type of control information comprising information regarding code allocation and modulation technique of HSDPA transmission of payload data to a plurality of wireless user equipment devices during the TTI;

the means for processing is arranged to perform steps comprising:

configuring the means for equalizing in accordance with the second type of control information, configuring the means for receiving to receive on a High Speed Downlink Shared Channel (HS-DSCH) of the carrier the HSDPA transmission of the payload data to the wireless user equipment device during the TTI, resulting in received payload data, and using the means for equalizing configured in accordance with the second type of control information to equalize and reduce interference in the received payload data; and the means for processing is further arranged to configure the means for equalizing in accordance with the second type of control information only once in each TTI sequence of a third predetermined number of consecutive TTIs, the third predetermined number being greater than one.

8. A wireless user equipment device for communicating with a base transceiver station of a radio network, the wireless user equipment device comprising:

means for receiving;

means for equalizing; and means for processing coupled to the means for receiving and to the means for equalizing;

wherein:

the means for receiving is configured to (1) receive on a High Speed Shared Control Channel (HS-SCCH) of a carrier of the radio network a first type of control information relating to a time transmission interval (TTI), the first type of control information comprising code allocation and modulation technique for HSDPA transmission of payload data to the wireless user equipment device during the TTI, and (2) receive on the HS-SCCH a second type of control information, the second type of control information comprising information regarding code allocation and modulation technique of HSDPA transmission of payload data to a plurality of wireless user equipment devices during the TTI;

the means for processing is arranged to perform steps comprising:

configuring the means for equalizing in accordance with the second type of control information, configuring the means for receiving to receive on a High Speed Downlink Shared Channel (HS-DSCH) of the carrier the HSDPA transmission of the payload data to the wireless user equipment device during the TTI, resulting in received payload data, and using the means for equalizing configured in accordance with the second type of control information to equalize and reduce interference in the received payload data; and the means for processing is further arranged to configure the means for equalizing in accordance with the second type of control information no more than one time in five consecutive TTIs.

* * * * *